United States Patent [19]

Frick

[11] 4,370,890

[45] Feb. 1, 1983

[54] CAPACITIVE PRESSURE TRANSDUCER WITH ISOLATED SENSING DIAPHRAGM

[75] Inventor: Roger L. Frick, Eden Prairie, Minn.

[73] Assignee: Rosemount Inc., Eden Prairie, Minn.

[21] Appl. No.: 194,758

[22] Filed: Oct. 6, 1980

[51] Int. Cl.³ .............................................. G01L 9/12
[52] U.S. Cl. ..................................... 73/718; 73/706; 73/708; 361/283
[58] Field of Search ......................... 73/706, 708, 718; 361/283

[56] References Cited

U.S. PATENT DOCUMENTS

| | | | |
|---|---|---|---|
| 3,618,390 | 10/1969 | Frick | 73/720 |
| 3,869,920 | 3/1975 | Miyauchi et al. | 73/398 |
| 3,895,524 | 7/1975 | Jurovsky | 73/393 |
| 3,926,055 | 12/1975 | Garnett | 73/398 |
| 3,994,166 | 11/1976 | Dower | 73/205 R |
| 3,999,435 | 12/1976 | Siegel | 73/393 |
| 4,072,057 | 2/1978 | Yasuhara et al. | 73/718 |
| 4,072,058 | 2/1978 | Whitehead, Jr. | 73/720 |
| 4,111,056 | 9/1978 | Mastromatteo | 73/706 |
| 4,163,395 | 8/1979 | Medlar et al. | 73/708 |
| 4,169,389 | 10/1979 | Yasuhara et al. | 73/718 |
| 4,218,925 | 8/1980 | DiDomizio | 73/706 |
| 4,285,244 | 8/1981 | Green | 73/706 |

FOREIGN PATENT DOCUMENTS

| | | | |
|---|---|---|---|
| 2824489 | 12/1979 | Fed. Rep. of Germany | 73/716 |
| 2827274 | 1/1980 | Fed. Rep. of Germany | 73/716 |
| 1582509 | 10/1969 | France | 73/716 |
| 7345283 | 7/1974 | France | 73/716 |
| 52-32368 | 1/1977 | Japan | 73/716 |
| 1384226 | 2/1975 | United Kingdom | 73/716 |
| 1415609 | 11/1975 | United Kingdom | 73/716 |
| 1421098 | 1/1976 | United Kingdom | 73/716 |
| 1423480 | 2/1976 | United Kingdom | 73/716 |
| 1455375 | 11/1976 | United Kingdom | 73/716 |

Primary Examiner—Donald O. Woodiel
Attorney, Agent, or Firm—Kinney, Lange, Braddock, Westmand and Fairbairn

[57] ABSTRACT

A capacitance transducer has a central chamber with a conductive diaphragm disposed therein to separate the chamber into at least two portions, at least one portion having an electrical conductor disposed thereon to form in combination with the diaphragm at least one variable sensor capacitor, and wherein at least one portion of the chamber is coupled by a passageway to communicate with an isolator having an isolator chamber and an isolator diaphragm which in combination with the conductive diaphragm enclose a substantially incompressible fluid such that when pressure is applied to an exposed side of the isolation diaphragm, the conductive diaphragm is urged to deflect and thus change the sensor capacitance. Configuration of the isolators, spaced from the sensor capacitors, and other factors disclosed herein, eliminate unwanted mechanical and thermal stresses thereby improving the capacitive sensors' response to pressure.

24 Claims, 6 Drawing Figures

CAPACITIVE PRESSURE TRANSDUCER WITH ISOLATED SENSING DIAPHRAGM

BACKGROUND OF THE INVENTION

1. Field of the Invention

The present invention relates to isolator arrangements for capacitive pressure sensors and to improved diaphragm mounting structures.

2. Prior Art

U.S. Pat. No. 3,618,390, owned by the same assignee as the present invention teaches the use of a sensing diaphragm which bottoms out on excessive pressure to protect the isolating diaphragms. This invention provided great impetus to capacitance pressure measurement techniques, as manifested by substantial commercial exploitation and success. The present invention as taught herein may be used in cooperation with the structure claimed in U.S. Pat. No. 3,618,390.

SUMMARY OF THE INVENTION

The present invention includes the use of a capacitance type pressure sensor having a diaphragm disposed in a central chamber and having isolators so that the process fluid or other pressure is applied to the isolator and the pressure is communicated to the sensor by a substantially incompressible fluid via passageway means to the central chamber. The diaphragm is then urged by the incompressible fluid to move to a position which along with an electrically conductive surface disposed on an internal surface of a portion of the central chamber forms a variable capacitor, which when driven by a suitable circuit produces an electrical signal responsive to pressure.

The invention envisions remote isolators, electrical isolation of the sensor from the isolators, and improved sensor mounting, material selection and configuration to reduce the effects of static line pressure and temperature. Such deleterious effects are substantially reduced, resulting in an improved capacitive signal which is representative of pressure.

DESCRIPTION OF THE PREFERRED EMBODIMENT

Figure 1:
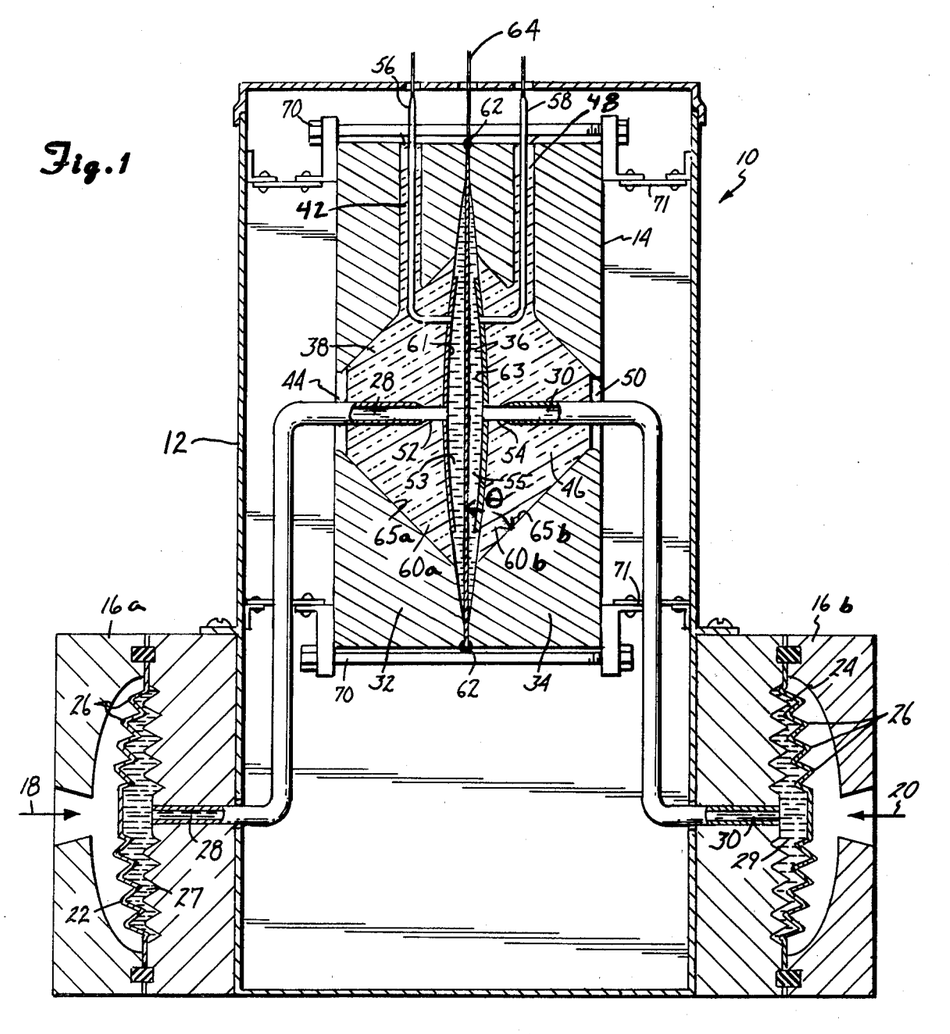
FIG. 1 is a sectional view of a pressure transducer made in accordance with the instant invention.

A transducer which preferably is used for differential pressure, gauge pressure, flow, level or other such pressure measurement is shown generally at 10. The transducer includes a transducer housing or frame 12 which supports a sensor housing 14 and a pair of isolator housings 16a and 16b. It is envisioned that housings 14, 16a and 16b may be included in or spaced from housing 12. The pressures to be sensed are represented by arrows 18 and 20 at the transducer input ports. Pressures 18 and 20 act on isolator diaphragms 22 and 24, respectively. Diaphragms 22 and 24 preferably are very flexible and are formed in a conventional manner. The corrugations 26 of diaphragms 22 and 24 represent a preferred isolator diaphragm construction having a plurality of convolutions, as desired. Chambers 27 and 29 are defined by diaphragms 22 and 24 in cooperation with the respective housings 16a and 16b. Chambers 27 and 29 are coupled to passageways 28 and 30, which preferably are formed by stainless steel tubing, but may be formed from other suitable materials.

Sensor housing 14 is preferably machined and formed from a metal such as stainless steel, preferably an austenitic stainless steel such as 304 is used. Generally, housing 14 is formed from two portions 32 and 34 which preferably are substantially equal in size and when assembled are generally divided by a sensor diaphragm 36 which is held at its edges and will elastically deflect under differential pressures and which typically is subjected to a desired radial tension. A central cone shaped cavity 38 with bores 42 and 44 is formed in portion 32 and, similarly a central cone shaped cavity 46 with bores 48 and 50 is formed in portion 34. Conduits 52 and 54 are formed in portions 32 and 34 to communicate with passageways 28 and 30, respectively. The interior openings of the conduits 52 and 54 form continuations of the passageways 28 and 30 to communicate with a chamber 53 defined in portion 32 by diaphragm 36 and the central section of material 60a in portion 32 and a second chamber 55 defined in portion 34 by diaphragm 36 and the central section of material 60b in portion 34. An electrical conductor 56 is inserted through bore 42 to chamber 38 and, similarly, a conductor 58 is inserted through bore 48 to chamber 46. Conductors 56 and 58 may be metal tubes to aid in filling the sensor chambers with a non-compressible fluid.

The electrically conductive portions of the housing 14 are electrically insulated from the metal tubes forming passageways 28 and 30 and from conductors 56 and 58. An insulative nonporous material 60a and 60b such as glass or ceramic, is filled into cavities 38 and 46 and bores 42 and 48 and is bonded to housing portions 32 and 34 along a surface forming an angle $\theta$ with respect to the plane formed by the joining of portions 32 and 34. The central section of material 60a and 60b and the central area of housing portions 32 and 34, as well as inner ends of conductors 56 and 58 are then contoured or recessed by grinding or machining, preferably to provide a suitable stop surface for sensor diaphragm 36 when the diaphragm 36 deflects under an overrange pressure applied to the isolator diaphragms. Conduits 52, 54 may be a single cylinder as shown, or a plurality of small cylinders in accord with the teaching of U.S. Pat. No. 3,618,390 to provide diaphragm support in an overpressure condition.

A suitable electrically conductive material is then deposited in a layer on the inner surface of material 60a and 60b in each housing portion as at 61 or 63. The layers face opposite sides of the sensor diaphragm 36 and are electrically coupled to conductors 56 and 58, respectively. Sensor diaphragm 36 preferably is formed from a suitable electrically conductive material and is fixed into position between housing portions 32 and 34 and layers 61 and 63 by a continuous bead weld 62 thus forming a common plate for material 61 and 63, hence forming two capacitors $C_1$ and $C_2$. A suitable conductor 64 is then coupled to sensor housing 14 which is at the same electrical potential as diaphragm 36. Sensor diaphragm 36 can also be formed from a nonconductive material and have a conductive portion disposed in or on the diaphragm to form such common plate for a variable sensor capacitor. A suitable conductor 64 is then coupled to such conductive portion. Bolts 70 may then be added to take up the pressure forces on sensor housing 14.

A suitable, substantially incompressible fluid, such as silicone oil, is then filled into each side of the transducer assembly through conductors 56 and 58 to the sensor diaphragm chamber formed in housing portion 32 by diaphragm 36, and to isolating chamber 27, and similarly to the sensor chamber in housing portion 34, and isolating chamber 29. When such spaces are filled, conductors 56 and 58 are pinched off at their outer ends and suitable leadwires are attached thereto.

The action of pressure on isolator diaphragms 22 and 24, the substantially incompressible fluid in chambers 27 and 29, passageways 28 and 30, and on sensing diaphragm 36 is fully explained, for example, in U.S. Pat. No. 3,618,390. The invention of the sensing diaphragm 36 bottoming out in an overpressure condition as taught in U.S. Pat. No. 3,618,390 or the isolating diaphragm 22 or 24 bottoming out in an overpressure condition may, as desired, be used with the present invention.

The physical location of isolator diaphragms 22 and 24 spaced from sensor diaphragm 36 is shown somewhat schematically, as the location of isolator diaphragms 22 and 24 is not critical, providing that such diaphragms are located so as not to apply undesired mechanical stress, other than the pressure through the incompressible fluid, to sensor housing 14. While sensor housing 14 preferably is fixedly mounted in housing 12 it is not required that it be rigidly mounted as by welding. As shown, it is retained by flexible straps 71, which are formed from an electrical insulative material to electrically isolate the sensor housing 14 from transducer housing 12 and to support sensor housing 14.

With chambers 27, 29, passageways 28 and 30 (including openings in conduits 52 and 54) and the chambers between layers 61 and 63 and diaphragm 36 filled with incompressible fluid, differentials between pressures represented by arrows 18 and 20 will cause diaphragm 36 to deflect proportional to pressure differential and its capacitance relative to layers 61 and 63 changes.

Figure 2:
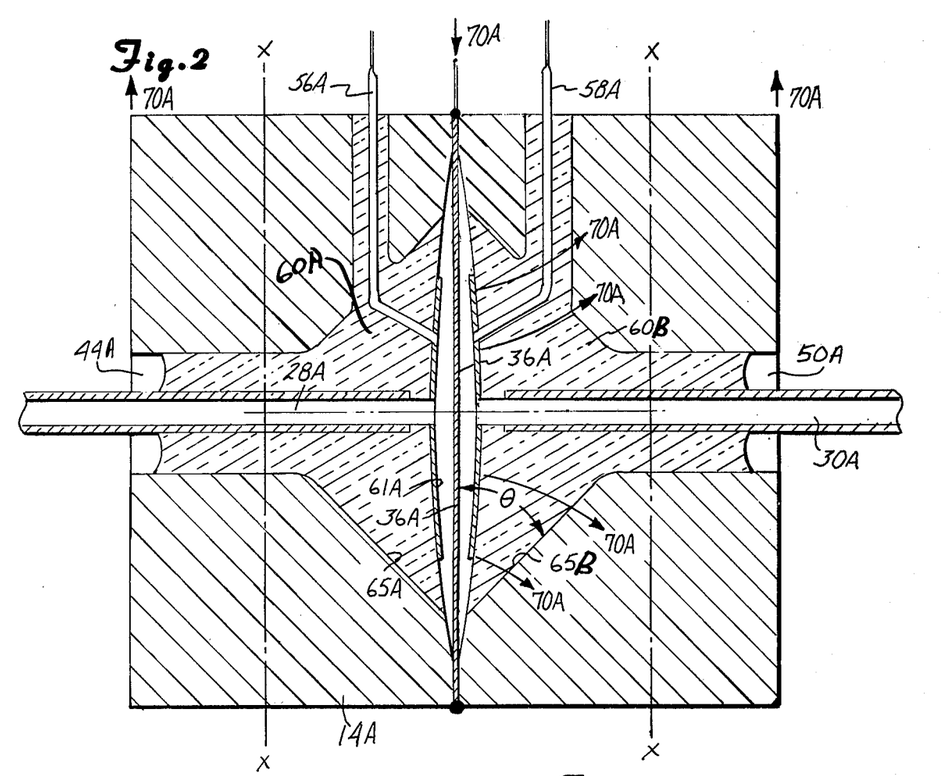
FIG. 2 is a sectional view of the sensor housing of another embodiment of the sensor housing of the pressure transducer.

Another embodiment of the invention is shown in FIG. 2. In this embodiment the sensor housing 14A is somewhat wider than the embodiment of FIG. 1. While the numbering corresponds to FIG. 1, (with a capital letter forming a part of the alphanumeric designations thereof) it is observed that with the increased width of sensor housing 14A, bores 44A and 50A are somewhat deeper in FIG. 2 than bores 44 and 50, and material 60A and 60B, has been filled to include a portion of such bores. An angle $\theta$ is the included angle from the plane of diaphragm 36A at its rest position to the conical surface forming the recess in the respective housing portion in which material 60A and 60B is filled. This angle determines the effective depth of the material 60A,60B (or 60a, 60b in the first form of the invention) which backs the capacitor plates 61A and 63A (or 61 and 63). Although an angle $\theta$ of approximately 45° is preferred for the embodiments of FIGS. 1 and 2, it has been found that angles from 25° to 70° have resulted in improved stability and thus improved performance over known constructions which comprise, for example, a non-compressive bond between the insulating material and metal. The angle also can be measured with respect to the central axis of the sensor housing which is perpendicular to the plane of diaphragm 36A (or 36) when it is at rest.

One significant advantage of the present invention is improvement of the static pressure effect on the pressure span of the transducer. In prior art embodiments, the effect of static pressure on span error has been found to be approximately a one percent (1%) change in output across the instrument span per one thousand (1000) pounds per square inch (PSI) change of static pressure. In such known transducers, the pressure on the outside of the sensor housing, caused by the pressure being sensed acting on the isolating diaphragms, and pressure from the inside of the sensor chamber caused by the pressure being sensed on the incompressible fluid resulted in sensor housing deformation outwardly in a known manner, as per Poisson's ratio.

Further, in known methods of manufacturing such capacitive transducers, the insulating material, upon which the conductive material is deposited to form the second plate of each of the variable capacitors, has been relatively thin in comparison to the insulative material thickness in the central cavity of the sensor housing as disclosed herein. When the insulative material is thin or when the insulating material to metal interface is somewhat parallel to the rest axis of the diaphragm (perpendicular to plane of the diaphragm), the insulating material-metal interfaces (bond) 65a, 65b, 65A, 65B are then subjected to a shear force which may cause the bond to weaken or fracture. When pressure is applied to a sensor having a fractured bond, such pressure causes the insulating material to move away from the diaphragm. The movement of the insulator material causes an undesirable change in capacitance not representative of the sensed pressure, which adds to the error effect caused by the static line pressure. When the sensor is formed in accordance with the present disclosure, bonds 65a, 65b, 65A, 65B are substantially in compression and, consequently, much less vulnerable to such fracture.

Figure 5A:
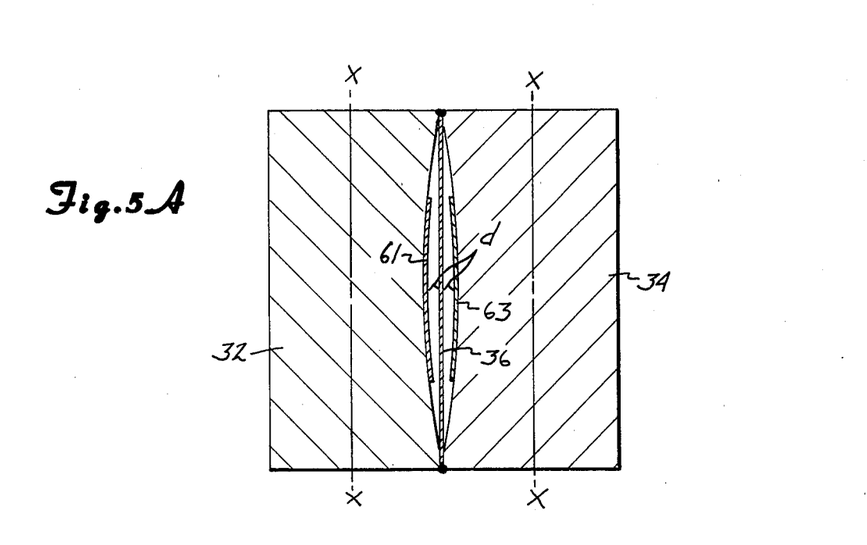
FIGS. 5A and 5B are sectional views which are illustrative only and apply to the configurations of FIGS. 1 and 2.

By removing the isolators from the side of the sensor housing, the capacitor plate spacing on both sides of the diaphragm 36 increases with increasing static line pressure applied at 18, 20 due to slight outward motion of the sensor portions with respect to the sensor diaphragm. This static line pressure increase also causes portions 32 and 34 to warp slightly about their respective neutral axes (shown in FIGS. 2 and 5 at X—X) as the two housing portions tend to contract adjacent the diaphragm (as shown by arrows 70A in the FIGS. 2 & 5B). (The insulation material is not specifically shown in FIG. 5A or 5B since these Figures are illustrative only and apply to the configurations of FIGS. 1 and 2.) Such warping is perhaps best explained by reference to FIG.

Figure 5B:
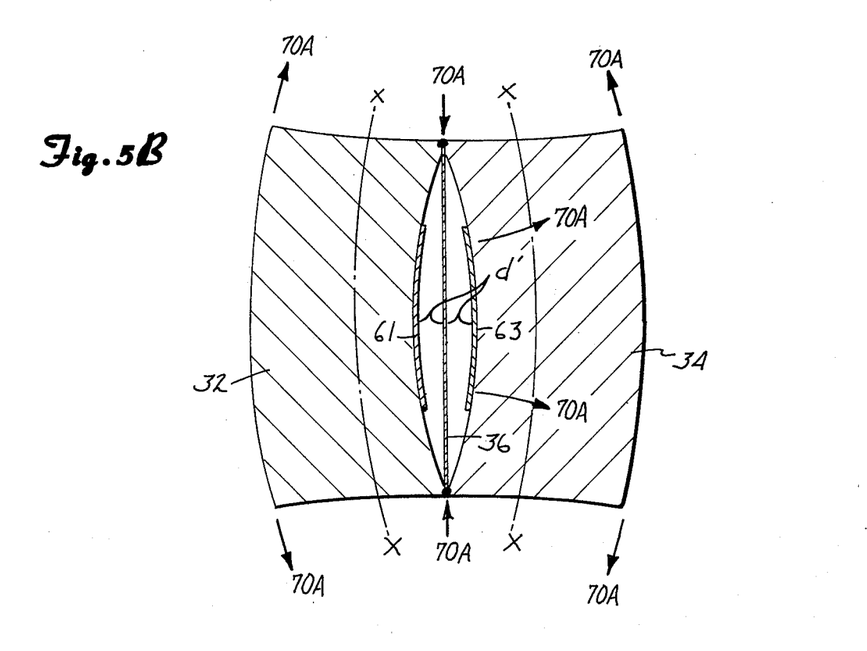

5A which shows portions 32 and 34 at rest and in FIG. 5B which shows an exaggerated warp condition (for emphasis) as caused by increasing static line pressure. As the static line pressure is increased the capacitance spacing (d) of FIG. 5A between the diaphragm 36 and capacitor plates 61 and 63 increases to d' (as shown in FIG. 5B) and such spacing change is not representative of the applied differential pressure. In accordance with the present invention, the change in capacitance caused by such warping is substantially compensated for by the decrease in diaphragm radial tension caused by the contraction adjacent the diaphragm. Radial tension or prestress applied to the diaphragm at time of construction along with suitable dimensions and materials results in the elastic stiffness of the diaphragm decreasing with increasing static pressure. Preferably the diaphragm material is high strength steel having good elastic characteristics. The compensation advantage is present at all static line pressures, but more fully realized at static line pressures above 500 psi.

The following equations further explain the static line pressure compensation according to a preferred embodiment of the instant invention having a first capacitor $C_1$ and a second capacitor $C_2$ as described herein:

$$0 = CH - CL/CH + CL \propto Xp/Xo \times 1/\delta_o$$

Where
- $0$ = the output signal from the differential pressure capacitance cell.
- $CH$ = the capacitance of the greater of $C_1$ or $C_2$.
- $CL$ = the capacitance of the lesser of $C_1$ or $C_2$.
- $Xp$ = diaphragm deflection with differential pressure.
- $Xo$ = capacitance spacing at zero (0) static line gauge pressure.
- $Xo'$ = capacitance spacing at elevated static line pressure.
- $\delta_o$ = diaphragm stretch at time of construction (initial prestretch).
- $\delta_o'$ = diaphragm stretch at elevated static line pressure.

Simplifying:

$$0 \propto Xp/Xo\delta_o$$

When the transducer is formed in accordance with the present invention as the static line pressure increases, the capacitance spacing $Xo$ increases to $Xo'$ and the diaphragm stretch ($\delta_o$) decreases to $\delta_o'$. By holding the product of $Xo \cdot \delta$ substantially equal to $Xo' \cdot \delta_o'$ hence, substantially equal to a constant, the diaphragm deflection ($Xp$) is responsive to the differential pressure applied thereto and the output (0) is thus independent of static line pressure.

Figure 3:
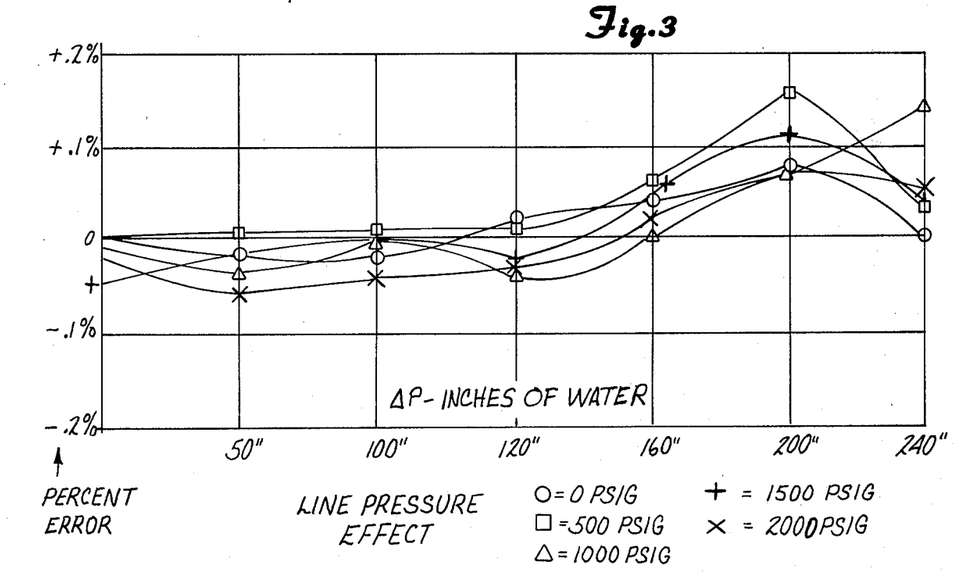
FIG. 3 is a graph showing the results of testing a transducer in accord with an embodiment of the invention showing percent error (in tenths (1/10) of one percent (1%) v. differentialpressure for five different calibrations having from 0 PSIG (pounds per square inch gage) static line pressure applied to both sides of the transducer to 2,000 PSIG to both sides of such transducers.

A transducer, made in accordance with the embodiments of FIG. 1 and FIG. 2, but not having an angle $\theta$ between 25° and 70° rather having a cylindrical, metal-insulating material interface bond; that is, the bond interface was first generally perpendicular ($\theta = 90°$) from diaphragm 36, then generally parallel ($\theta = 0°$) from diaphragm 36 generally as shown in U.S. Pat. No. 3,618,390, was tested under actual loading conditions. This early form of the invention did not then include the compressive bond taught herein, but rather had the prior art shear bond. The improved bond is helpful as taught to avoid bond fracture and it is believed from analyzation and evaluation that such fracture did not occur and, therefore the nature of the bond did not affect test results. In the embodiment tested, the other principles of the invention were followed, such as separating the isolator 16a, 16b from sensor housing 14 and compensating for sensor housing 14 warp with a suitable sensor diaphragm 36 prestress. Sensor diaphragm 36 was 1.8 mils thick and approximately 1.12 inch in diameter and had approximately 105,000 PSI in prestress applied (though prestress from 50,000 to 200,000 PSI may be acceptable) and was formed from NiSpan C; insulative material 60a, 60b, 60A, 60B was Owens 0120 glass; and, sensor housing 14 was NiSpan C material approximately 1.250 inches in diameter. Capacitance spacing ($Xo$) in the center was approximately 0.0075 inches. Isolators 16a, 16b were formed from stainless steel (304SST) and were approximately 3 inches in diameter and were coupled to chambers 53, 55 by passageways 28, 30 formed from 1/16 inch O.D. stainless steel tubing. The results of such testing are shown in FIG. 3. As shown, all test points deviations due to static line pressure effect from zero (0) PSIG to two thousand (2000) PSIG are less than 0.2% across the differential pressure span of 0 to 240 inches of water. The curves of FIG. 3 show a very small mechanical hysteresis. Such mechanical hysteresis is not uncommon and depends not only on the instantaneous value of stress as caused by differential pressure and static line pressure but also on the previous history of such stress.

Yet a further improvement is attained by the present invention, as the zero stability of the transducer, which in known transducers varies with both temperature and static pressure, is improved because the isolator housings are not in direct physical contact with the sensor housing. Only the tubes forming passageways 28 and 30 are in direct contact with sensor housing 14 and these tubes yield to accommodate loads or changes due to temperature on the isolators without stressing the sensor housing 14.

Figure 4:
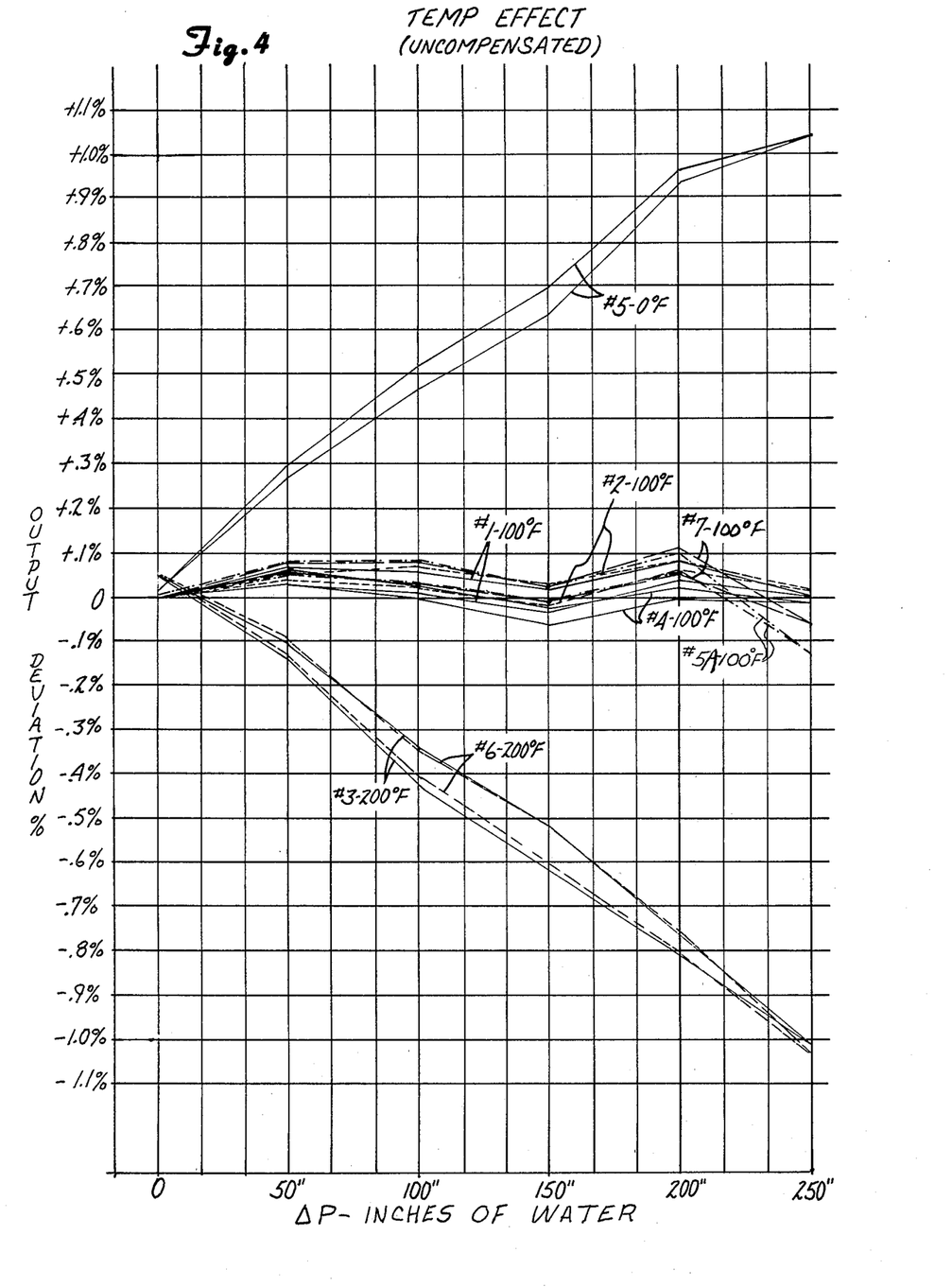
FIG. 4 is a graphic representation of the results of testing a transducer in accord with an embodiment of the invention showing output deviation in percent v. differential line pressure to show temperature effect (uncompensated) for several calibrations.

A test also was conducted to demonstrate the improved uncompensated temperature effect with respect to the stability of the output capacitance signal of the present invention of the embodiment described above; such results are shown in FIG. 4. The "uncompensated" effect is the error present before any compensation of an electrical signal is applied. Electrical signal compensation is commonly used to reduce errors further, but it is highly advantageous to provide a structure having a low uncompensated error. Each curve of FIG. 4 represents a separate calibration. Several such calibrations were accomplished, seven of which are shown on FIG. 4, one at 100° F., then again at 100° F., then at 200° F., then 100° F., then 0° F., then 100° F., again 200° F., and finally at 100° F. The curves show that the configuration resulted in excellent stability and in a very low thermal hysteresis as the capacitance deviation at 100° F. for three calibrations at that temperature was less than ±0.18%. Thermal hysteresis refers to the difference in calibration results at a specific temperature after coming to that calibration temperature from higher and lower temperatures respectively.

Many embodiments formed of different materials and having different dimensions have been successfully tested; in successful tests, the sensor diaphragm 36 was formed from Havar ® steel of Hamilton Industries (or Elgiloy ® alloy of Elgiloy Co.), insulative material 60 was alkali lead glass, specifically Corning 1990 glass and the sensor housing 14 was austenitic stainless steel.

One further advantage of the present invention is that since the isolator diaphragms are no longer an integral part of the sensor housing 14, the size of the isolator diaphragms may be increased relative to the sensor housing. This increase in size is important in some instances to reduce the effects of temperature and other factors on overall transducer performance.

Further, sensor housing 14 preferably is electrically isolated from transducer housing 12 resulting in a simplification of the transducer circuitry when electrical isolation is desired which is often the case for industrial pressure measurements.

While the invention has been described using a variable capacitance sensor, those skilled in the art understand that a variable impedance, that is a variable impedance variable reactance sensor, can be used with the invention as described herein.

In summary, the several listed advantages as well as those apparent to those skilled in the art are realized from the improvements of the present invention.

What I claim is:

1. An improved capacitive pressure transducer having a transducer housing,
   a sensor housing disposed in the transducer housing and having a central cavity,
   diaphragm means supported on said sensor housing and extending across the central cavity to thereby divide the central cavity into two central chambers, said diaphragm means being deflectable under pressure and at least a portion thereof being conductive to provide a first plate of a variable sensor capacitor,
   each of said chambers having a conductive surface portion spaced from the diaphragm for providing second plates of a pair of variable sensor capacitors,
   a pair of isolators, said isolators each having an isolator chamber and an isolator diaphragm disposed therein,
   separate passageway means coupling each isolator chamber to a separate central chamber,
   means to permit applying separate pressures to the respective isolator diaphragms at a static line pressure, each isolator chamber, its associated passageway means and connected central chamber enclosing a substantially incompressible fluid such that the diaphragm means is urged to deflect and change the capacitance of the variable sensor capacitors responsive to the differential between the static line pressures applied to the isolator diaphragms,
   means for physically supporting the isolators in a position spaced from the sensor housing, the sensor housing and the diaphragm means being constructed so that as the sensor housing warps under increasing static line pressure levels on the isolators, the stress on the diaphragm means correspondingly changes to reduce error in capacitance caused by changing static line pressure levels as the diaphragm means deflects in response to the same dfferential in static line pressures.

2. A transducer according to claim 1 wherein the diaphragm means is supported with respect to the sensor housing to provide an initial prestress on the diaphragm.

3. Apparatus according to claim 1 wherein the isolators are spaced from the sensor housing for isolation such that mechanical stress on portions of either of the isolators, other than as caused by the incompressible fluid, has no substantial effect on the sensor housing.

4. Apparatus according to claim 1 wherein the respective passageway means transmits the changes in pressure through the substantially incompressible fluid to the respective central chamber and the diaphragm means therein without subjecting the sensor housing to other substantial mechanical stress.

5. Apparatus according to claim 1 wherein the sensor housing is formed from metal and the cavity is partially filled with a non-porous, insulating material forming an interface surface with the metal of the sensor housing, and wherein the central chambers are each formed in the insulating material, the conductive surface portions of the central chambers being disposed on the insulating material, the interface surface of the insulating material and metal being positioned so as to be subjected to compression forces under static line pressures.

6. An improved capacitive pressure transducer having a transducer housing,
   a sensor housing disposed in the transducer housing and having a central cavity,
   diaphragm means supported on said sensor housing and extending across the central cavity to thereby divide the central cavity into two central chambers, said diaphragm means being deflectable under pressure and at least a portion thereof being conductive to provide a first plate of a variable sensor capacitor,
   each of said chambers having a conductive surface portion spaced from the diaphragm for providing second plates of a pair of variable sensor capacitors,
   a pair of isolators, said isolators each having an isolator chamber and an isolator diaphragm disposed therein,
   separate passageway means coupling each isolator chamber to a separate central chamber,
   means to permit applying separate pressures to the respective isolator diaphragms at a static line pressure, each isolator chamber, its associated passageway means and connected central chamber enclosing a substantially incompressible fluid such that the diaphragm means is urged to deflect and change the capacitance of the variable sensor capacitors responsive to the differential between the static line pressure applied to the isolator diaphragms,
   means for physically supporting the isolators in a position spaced from the sensor housing,
   the sensor housing being constructed and clamping the diaphragm means so that the diaphragm means is stressed at different amounts when the static line pressure changes to substantially compensate the capacitance output as the sensor housing warps under changes in static line pressure with the same differential pressure.

7. Apparatus according to claim 6, wherein the sensor housing and diaphragm means have coefficients of elasticity and are of relative size so that the stress on the diaphragm means changes to provide a maximum error in output across the span of response of the transducer of less than 1% for each 1,000 psi of static line pressure change on the diaphragm means at the same differential pressure.

8. Apparatus according to claim 6 wherein the sensor housing and diaphragm means material is such that the maximum error in output across the span of response of the transducer is less than 0.25% per 1,000 psi of static line pressure change on the diaphragm means at the same differential pressure.

9. A capacitive pressure transducer including a support frame, a sensor housing mounted on said frame, said sensor housing having a central chamber defined therein and a diaphragm having a conductive portion forming a first capacitor plate enclosing one portion of the chamber, said diaphragm being supported on the housing and held taut thereon under an initial prestress of between 50,000 and 200,000 psi, means forming a second capacitor plate on the surface defining said chamber and cooperating with said diaphragm to form a variable capacitor, said housing including a second means enclosing a surface of said diaphragm opposite from said second capacitor plate, passageway means open through the plate means to said second means, and isolator means spaced from the sensor housing and having an isolator chamber defined therein, conduit means connecting the chamber in said isolator means to the passageway means, said passageway means, said isolator means and the second means enclosing said diaphragm being filled with a substantially incompressible fluid, said isolator chamber including at least one wall deflectable under pressure to transmit such pressure through the incompressible fluid to act upon such diaphragm.

10. The apparatus of claim 9 wherein the diaphragm is disposed on the sensor housing and there is an initial prestress on such diaphragm.

11. Apparatus according to claim 10 wherein the prestress is between 50,000 and 200,000 PSI.

12. The combination as specified in claim 9 wherein said isolator means is mounted on said frame at a location spaced from said transducer housing.

13. The apparatus as specified in claim 12 wherein said isolator means comprises an isolator housing, said isolator chamber being formed in said isolator housing, said wall deflectable under pressure comprising a flexible diaphragm enclosing said isolator chamber.

14. The combination as specified in claim 13 wherein said conduit means comprise tubing which will bend under external loads.

15. A variable reactance pressure transducer having an internal cavity, a deflectable sensing diaphragm mounted on the transducer and dividing the cavity into first and second cavity sections, said transducer having a central axis lying generally normal to said diaphragm, said cavity sections each being defined by cavity surfaces which taper from the diaphragm inwardly toward the central axis in direction away from the diaphragm, a filling of insulation material in each of said cavity sections, said insulation material having recessed surfaces adjacent the diaphragm on opposite sides thereof to form chambers permitting deflection of said diaphragm under loads toward the respective recessed surface, means to provide pressure to opposite sides of said diaphragm tending to deflect said diaphragm when pressures on opposite sides are different from each other, and means to sense the deflection of said diaphragm with respect to the recessed surfaces.

16. The combination as specified in claim 15 wherein said insulation material is a glass or ceramic material bonded to the cavity surfaces.

17. The combination as sepcified in claim 16 wherein said cavity surfaces are generally conical, and are generated about the central axis to form an included angle of between 20° and 70° with respect to the central axis.

18. The combination of claim 17 wherein the bond between the insulation material and the glass or ceramic material is substantially in compression when the sensing diaphragm is under load.

19. Apparatus according to claim 18 wherein the diaphragm is formed from a cobalt based, high strength stainless steel, the insulation material is an alkali-lead glass and the housing is stainless steel.

20. Apparatus according to claim 18 wherein the diaphragm is NiSpan C, the insulation material is Owens 0120 glass and the housing is NiSpan C.

21. Apparatus according to claim 18 wherein the diaphragm is formed from Havar stainless steel, the insulation material is Corning 1990 glass and the housing is austenitic stainless steel.

22. Apparatus according to claim 18 wherein the diaphragm is formed from Elgiloy alloy, the insulation material is Corning 1990 glass and the housing is austenitic stainless steel.

23. In a capacitive pressure transducer having a housing with an internal cavity, a deflectable, electrically conducting sensing diaphragm mounted on the transducer and dividing the cavity into first and second cavity sections, said transducer having a central axis lying generally normal to said diaphragm, a filling of insulation material in each of said cavity sections, said insulation material having recessed surfaces adjacent the diaphragm on opposite sides thereof to form chambers permitting deflection of said diaphragm under loads toward the respective recessed surface, means on the respective recessed surfaces forming capacitor plates which in combination with the diaphragm form first and second sensing capacitors generally symmetrical with each other relative to the diaphragm at a rest position and having capacitance values of $C_1$ and $C_2$, respectively, means to provide pressure to opposite sides of said diaphragm tending to deflect said diaphragm when pressures on opposite sides are different from each other to thereby lower the capacitance value of one of the sensing capacitors and raise the value of the other sensing capacitor, the reference position of the diaphragm being reached when the pressure on opposite sides of the diaphragm is equal, the improvement comprising selecting the dimensions and the coefficients of elasticity of the diaphragm, the insulation material and the housing in relation to the diaphragm diameter to insure that the product of diaphragm stretch times the capacitance spacing at rest position of the diaphragm remains substantially equal to a constant under changing pressures of equal magnitudes on opposite sides of said diaphragm.

24. An improved capacitive pressure transducer having a transducer housing,
a sensor housing disposed in and electrically isolated from the transducer housing,
diaphragm means, deflectable under pressure, at least a portion of which is conductive, supported on the sensor housing for providing a first plate of a variable sensor capacitor,
at least one cavity in the sensor housing, said cavity having a conductive surface portion for providing a second plate of a variable sensor capacitor and for providing in combination with the diaphragm means a central chamber,
at least one isolator, said isolator having an isolator chamber and an isolator diaphragm disposed therein, passageway means coupling said isolator chamber to the central chamber, and the isolator chamber, and said passageway means and connected central chamber enclosing a substantially incompressible fluid such that the diaphragm means is urged to deflect and change the capacitance of the variable sensor capacitor responsive to the pressure applied to the isolator diaphragm, and means for physically supporting the isolator in a position spaced from the sensor housing, including means to electrically isolate the isolator from the sensor housing.

* * * * *